US008399387B2

(12) United States Patent  
Roddy et al.

(10) Patent No.: US 8,399,387 B2
(45) Date of Patent: *Mar. 19, 2013

(54) SETTABLE COMPOSITIONS COMPRISING CEMENT KILN DUST AND RICE HUSK ASH AND METHODS OF USE

(75) Inventors: Craig W. Roddy, Duncan, OK (US); Jiten Chatterji, Duncan, OK (US); D. Chad Brenneis, Marlow, OK (US); Callie R. Jarratt, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,163

(22) Filed: Sep. 14, 2012

(65) Prior Publication Data

US 2013/0008351 A1 Jan. 10, 2013

Related U.S. Application Data

(60) Division of application No. 13/479,476, filed on May 24, 2012, now Pat. No. 8,327,939, which is a continuation-in-part of application No. 12/975,196, filed on Dec. 21, 2010, which is a continuation-in-part of application No. 12/821,412, filed on Jun. 23, (Continued)

(51) Int. Cl.
C04B 18/06 (2006.01)
E21B 33/13 (2006.01)
E21B 33/14 (2006.01)

(52) U.S. Cl. ........ 507/271; 507/219; 507/269; 166/292; 166/293; 106/707

(58) Field of Classification Search .................. None
See application file for complete search history.

(56) References Cited

U.S. PATENT DOCUMENTS

| | | | |
|---|---|---|---|
| 2,045,899 A | 6/1936 | Davis | |
| 2,094,316 A | 9/1937 | Cross et al. | |
| 2,193,775 A | 3/1940 | Stratford | |
| 2,193,807 A | 3/1940 | Dieterich | |
| 2,329,940 A | 9/1943 | Ponzer | |
| 2,772,739 A | 12/1956 | Arie | |
| 2,842,205 A | 7/1958 | Allen et al. | |
| 2,848,051 A | 8/1958 | Williams | |
| 2,871,133 A | 1/1959 | Palonen et al. | |
| 2,880,096 A | 3/1959 | Hurley | |
| 2,945,769 A | 7/1960 | Gama et al. | |
| 3,066,031 A | 11/1962 | Schifferle | |
| 3,168,139 A | 2/1965 | Kennedy et al. | |
| 3,320,077 A | 5/1967 | Prior | |
| 3,407,193 A | 10/1968 | McColl et al. | |
| 3,454,095 A | 7/1969 | Messenger et al. | |
| 3,499,491 A | 3/1970 | Wyant et al. | |
| 3,557,876 A | 1/1971 | Tragesser | |
| 3,574,816 A | 4/1971 | Abbdellatif et al. | |
| 3,748,159 A | 7/1973 | George | |
| 3,876,005 A | 4/1975 | Fincher et al. | |
| 3,887,009 A | 6/1975 | Miller et al. | |
| 3,887,385 A | 6/1975 | Quist et al. | |
| 3,959,007 A | 5/1976 | Pitt | |
| 4,018,617 A | 4/1977 | Nicholson | |
| 4,018,619 A | 4/1977 | Webster et al. | |
| 4,031,184 A | 6/1977 | McCord | |
| 4,036,301 A | 7/1977 | Powers et al. | |
| 4,101,332 A | 7/1978 | Nicholson | |
| 4,105,459 A | 8/1978 | Mehta | |
| 4,176,720 A | 12/1979 | Wilson | |
| 4,268,316 A | 5/1981 | Wills et al. | |
| 4,274,881 A | 6/1981 | Langton | |
| 4,341,562 A | 7/1982 | Ahlbeck | |
| RE31,190 E | 3/1983 | Detroit et al. | |
| 4,407,677 A | 10/1983 | Wills et al. | |
| 4,432,800 A | 2/1984 | Kneller et al. | |
| 4,435,216 A | 3/1984 | Diehl et al. | |
| 4,436,850 A | 3/1984 | Burdick et al. | |
| 4,460,292 A | 7/1984 | Durham et al. | |
| 4,494,990 A | 1/1985 | Harris | |
| 4,515,635 A | 5/1985 | Rao et al. | |
| 4,519,452 A | 5/1985 | Tsao et al. | |
| 4,555,269 A | 11/1985 | Rao et al. | |
| 4,614,599 A | 9/1986 | Walker | |
| 4,624,711 A | 11/1986 | Styron | |
| 4,633,950 A | 1/1987 | Delhommer et al. | |
| 4,676,317 A | 6/1987 | Fry et al. | |
| 4,676,832 A | 6/1987 | Childs et al. | |
| 4,741,782 A | 5/1988 | Styron | |
| 4,784,223 A | 11/1988 | Worrall et al. | |
| 4,829,107 A | 5/1989 | Kindt et al. | |
| 4,883,125 A | 11/1989 | Wilson et al. | |

(Continued)

FOREIGN PATENT DOCUMENTS

CA 2064682 4/1992
CA 2336077 1/2000

(Continued)

OTHER PUBLICATIONS

U.S. Appl. No. 13/535,145, filed Jun. 27, 2012, Benkley et al.
U.S. Appl. No. 13/560,406, filed Jul. 27, 2012, Brenneis et al.
U.S. Appl. No. 13/595,493, filed Aug. 27, 2012, Benkley.
U.S. Appl. No. 13/605,875, filed Sep. 6, 2012, Brenneis.
U.S. Appl. No. 13/606,098, filed Sep. 7, 2012, Brenneis.
U.S. Appl. No. 13/606,120, filed Sep. 7, 2012, Brenneis.
U.S. Appl. No. 13/620,013, filed Sep. 14, 2012, Roddy.
U.S. Appl. No. 13/622,821, filed Sep. 19, 2012, Brenneis.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.

(Continued)

Primary Examiner — John J Figueroa
(74) Attorney, Agent, or Firm — Craig W. Roddy; Tumey L.L.P.

(57) ABSTRACT

Embodiments disclose method and compositions that comprise cement kiln dust and rice husk ash. An embodiment comprises a method of cementing comprising: placing a settable composition into a subterranean formation, the settable composition comprising cement kiln dust, rice husk ash, and water; and allowing the settable composition to set. Another embodiment discloses a settable composition comprising cement kiln dust, rice husk ash, and water.

25 Claims, No Drawings

Related U.S. Application Data 2010, now Pat. No. 8,307,899, which is a continuation-in-part of application No. 12/606,381, filed on Oct. 27, 2009, now Pat. No. 7,743,828, which is a continuation-in-part of application No. 12/420,630, filed on Apr. 8, 2009, now Pat. No. 7,631,692, which is a continuation-in-part of application No. 12/349,676, filed on Jan. 7, 2009, now Pat. No. 7,674,332, which is a division of application No. 12/034,886, filed on Feb. 21, 2008, now Pat. No. 7,478,675, which is a continuation-in-part of application No. 11/223,669, filed on Sep. 9, 2005, now Pat. No. 7,445,669.

(56) References Cited

U.S. PATENT DOCUMENTS

| | | | |
|---|---|---|---|
| 4,941,536 | A | 7/1990 | Brothers et al. |
| 4,992,102 | A | 2/1991 | Barbour |
| 5,030,366 | A | 7/1991 | Wilson et al. |
| 5,049,288 | A | 9/1991 | Brothers et al. |
| 5,058,679 | A | 10/1991 | Hale et al. |
| RE33,747 | E | 11/1991 | Hartley et al. |
| 5,086,850 | A | 2/1992 | Harris et al. |
| 5,121,795 | A | 6/1992 | Ewert et al. |
| 5,123,487 | A | 6/1992 | Harris et al. |
| 5,125,455 | A | 6/1992 | Harris et al. |
| 5,127,473 | A | 7/1992 | Harris et al. |
| 5,183,505 | A | 2/1993 | Spinney |
| 5,213,160 | A | 5/1993 | Nahm et al. |
| 5,215,585 | A | 6/1993 | Luthra et al. |
| 5,238,064 | A | 8/1993 | Dahl et al. |
| 5,252,128 | A | 10/1993 | Gopalkrishnan |
| 5,266,111 | A | 11/1993 | Barbour |
| 5,295,543 | A | 3/1994 | Terry et al. |
| 5,305,831 | A | 4/1994 | Nahm |
| 5,314,022 | A | 5/1994 | Cowan et al. |
| 5,327,968 | A | 7/1994 | Onan et al. |
| 5,337,824 | A | 8/1994 | Cowan |
| 5,339,902 | A | 8/1994 | Harris |
| 5,346,548 | A | 9/1994 | Mehta |
| 5,352,288 | A | 10/1994 | Mallow |
| 5,358,044 | A | 10/1994 | Hale et al. |
| 5,358,049 | A | 10/1994 | Hale et al. |
| 5,361,841 | A | 11/1994 | Hale et al. |
| 5,361,842 | A | 11/1994 | Hale et al. |
| 5,368,103 | A | 11/1994 | Heathman et al. |
| 5,370,185 | A | 12/1994 | Cowan et al. |
| 5,372,641 | A | 12/1994 | Carpenter |
| 5,382,290 | A | 1/1995 | Nahm et al. |
| 5,383,521 | A | 1/1995 | Onan et al. |
| 5,383,967 | A | 1/1995 | Chase |
| 5,398,758 | A | 3/1995 | Onan et al. |
| 5,417,759 | A | 5/1995 | Huddleston |
| 5,423,379 | A | 6/1995 | Hale et al. |
| 5,430,235 | A | 7/1995 | Hooykaas et al. |
| 5,439,056 | A | 8/1995 | Cowan |
| 5,456,751 | A | 10/1995 | Zandi et al. |
| 5,458,195 | A | 10/1995 | Totten et al. |
| 5,464,060 | A | 11/1995 | Hale et al. |
| 5,472,051 | A | 12/1995 | Brothers |
| 5,476,144 | A | 12/1995 | Nahm et al. |
| 5,494,513 | A | 2/1996 | Fu et al. |
| 5,499,677 | A | 3/1996 | Cowan |
| 5,515,921 | A | 5/1996 | Cowan et al. |
| 5,518,996 | A | 5/1996 | Maroy et al. |
| 5,520,730 | A | 5/1996 | Barbour |
| 5,529,123 | A | 6/1996 | Carpenter et al. |
| 5,529,624 | A | 6/1996 | Riegler |
| 5,536,311 | A | 7/1996 | Rodrigues |
| 5,542,782 | A | 8/1996 | Carter et al. |
| 5,554,352 | A | 9/1996 | Jaques et al. |
| 5,569,324 | A | 10/1996 | Totten et al. |
| 5,580,379 | A | 12/1996 | Cowan |
| 5,584,926 | A | 12/1996 | Borgholm et al. |
| 5,585,333 | A | 12/1996 | Dahl et al. |
| 5,588,489 | A | 12/1996 | Chatterji et al. |
| 5,626,665 | A | 5/1997 | Barger et al. |
| 5,641,584 | A | 6/1997 | Andersen et al. |
| 5,673,753 | A | 10/1997 | Hale et al. |
| 5,681,384 | A | 10/1997 | Liskowitz |
| 5,688,844 | A | 11/1997 | Chatterji et al. |
| 5,711,383 | A | 1/1998 | Terry et al. |
| 5,716,910 | A | 2/1998 | Totten et al. |
| 5,728,654 | A | 3/1998 | Dobson et al. |
| 5,795,924 | A | 8/1998 | Chatterji et al. |
| 5,820,670 | A | 10/1998 | Chatterji et al. |
| 5,851,960 | A | 12/1998 | Totten et al. |
| 5,866,516 | A | 2/1999 | Costin |
| 5,866,517 | A | 2/1999 | Carpenter et al. |
| 5,874,387 | A | 2/1999 | Carpenter et al. |
| 5,897,699 | A | 4/1999 | Chatterji et al. |
| 5,900,053 | A | 5/1999 | Brothers et al. |
| 5,913,364 | A | 6/1999 | Sweatman |
| 5,988,279 | A | 11/1999 | Udarbe et al. |
| 6,022,408 | A | 2/2000 | Stokes et al. |
| 6,060,434 | A | 5/2000 | Sweatman et al. |
| 6,060,535 | A | 5/2000 | Villar et al. |
| 6,063,738 | A | 5/2000 | Chatterji et al. |
| 6,098,711 | A | 8/2000 | Chatterji et al. |
| 6,138,759 | A | 10/2000 | Chatterji et al. |
| 6,143,069 | A | 11/2000 | Brothers et al. |
| 6,145,591 | A | 11/2000 | Boncan et al. |
| 6,153,562 | A | 11/2000 | Villar et al. |
| 6,167,967 | B1 | 1/2001 | Sweatman |
| 6,170,575 | B1 | 1/2001 | Reddy et al. |
| 6,230,804 | B1 | 5/2001 | Mueller et al. |
| 6,244,343 | B1 | 6/2001 | Brothers et al. |
| 6,245,142 | B1 | 6/2001 | Reddy et al. |
| 6,258,757 | B1 | 7/2001 | Sweatman et al. |
| 6,277,189 | B1 | 8/2001 | Chugh |
| 6,312,515 | B1 | 11/2001 | Barlet-Gouedard et al. |
| 6,315,042 | B1 | 11/2001 | Griffith et al. |
| 6,328,106 | B1 | 12/2001 | Griffith et al. |
| 6,332,921 | B1 | 12/2001 | Brothers et al. |
| 6,367,550 | B1 | 4/2002 | Chatterji et al. |
| 6,379,456 | B1 | 4/2002 | Heathman et al. |
| 6,402,833 | B1 | 6/2002 | O'Hearn et al. |
| 6,409,819 | B1 | 6/2002 | Ko |
| 6,416,574 | B1 | 7/2002 | Steelhammer |
| 6,451,104 | B2 | 9/2002 | Mehta |
| 6,457,524 | B1 | 10/2002 | Roddy |
| 6,478,869 | B2 | 11/2002 | Reddy et al. |
| 6,488,763 | B2 | 12/2002 | Brothers et al. |
| 6,488,764 | B2 | 12/2002 | Westerman |
| 6,494,951 | B1 | 12/2002 | Reddy et al. |
| 6,500,252 | B1 | 12/2002 | Chatterji et al. |
| 6,508,305 | B1 | 1/2003 | Brannon et al. |
| 6,516,884 | B1 | 2/2003 | Chatterji et al. |
| 6,524,384 | B2 | 2/2003 | Griffith et al. |
| 6,547,871 | B2 | 4/2003 | Chatterji et al. |
| 6,547,891 | B2 | 4/2003 | Linden et al. |
| 6,561,273 | B2 | 5/2003 | Brothers et al. |
| 6,562,122 | B2 | 5/2003 | Dao et al. |
| 6,565,647 | B1 | 5/2003 | Day et al. |
| 6,572,697 | B2 | 6/2003 | Gleeson et al. |
| 6,610,139 | B2 | 8/2003 | Reddy et al. |
| 6,626,243 | B1 | 9/2003 | Go Boncan |
| 6,645,290 | B1 | 11/2003 | Barbour |
| 6,656,265 | B1 | 12/2003 | Garnier et al. |
| 6,660,080 | B2 | 12/2003 | Reddy et al. |
| 6,666,268 | B2 | 12/2003 | Griffith et al. |
| 6,668,929 | B2 | 12/2003 | Griffith et al. |
| 6,689,208 | B1 | 2/2004 | Brothers |
| 6,702,044 | B2 | 3/2004 | Reddy et al. |
| 6,706,108 | B2 | 3/2004 | Polston |
| 6,708,760 | B1 | 3/2004 | Chatterji et al. |
| 6,715,568 | B1 | 4/2004 | Bailey |
| 6,716,282 | B2 | 4/2004 | Griffith et al. |
| 6,729,405 | B2 | 5/2004 | DiLullo et al. |
| 6,755,905 | B2 | 6/2004 | Oates |
| 6,767,398 | B2 | 7/2004 | Trato |
| 6,776,237 | B2 | 8/2004 | Dao et al. |
| 6,796,378 | B2 | 9/2004 | Reddy et al. |
| 6,797,054 | B2 | 9/2004 | Chatterji et al. |

| | | |
|---|---|---|
| 6,823,940 B2 | 11/2004 | Reddy et al. |
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,840,318 B2 | 1/2005 | Lee |
| 6,846,357 B2 | 1/2005 | Reddy et al. |
| 6,848,519 B2 | 2/2005 | Reddy et al. |
| 6,874,578 B1 | 4/2005 | Garnier |
| 6,883,609 B2 | 4/2005 | Drochon |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,022,755 B1 | 4/2006 | Chatterji et al. |
| 7,048,053 B2 | 5/2006 | Santra et al. |
| 7,077,203 B1 | 7/2006 | Roddy et al. |
| 7,101,829 B2 | 9/2006 | Guichard |
| 7,174,962 B1 | 2/2007 | Roddy et al. |
| 7,182,137 B2 | 2/2007 | Fyten et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy |
| 7,284,609 B2 | 10/2007 | Roddy et al. |
| 7,303,015 B2 | 12/2007 | Fyten |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,350,573 B2 | 4/2008 | Reddy |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,855 B2 | 7/2008 | Chatterji et al. |
| 7,409,990 B1 | 8/2008 | Burts et al. |
| 7,445,669 B2 | 11/2008 | Roddy et al. |
| 7,478,675 B2 | 1/2009 | Roddy et al. |
| 7,607,482 B2 | 10/2009 | Roddy et al. |
| 7,607,484 B2 | 10/2009 | Roddy et al. |
| 7,627,870 B1 | 12/2009 | Michaeli et al. |
| 7,631,692 B2 | 12/2009 | Roddy et al. |
| 7,674,332 B2 | 3/2010 | Roddy et al. |
| 7,743,828 B2 | 6/2010 | Roddy et al. |
| 7,784,542 B2 | 8/2010 | Roddy et al. |
| 7,789,150 B2 | 9/2010 | Roddy et al. |
| 7,815,880 B2 | 10/2010 | Constantz et al. |
| 7,922,809 B1 | 4/2011 | Constantz et al. |
| 7,927,419 B2 | 4/2011 | Roddy |
| 8,006,446 B2 | 8/2011 | Constantz et al. |
| 8,030,253 B2 | 10/2011 | Roddy et al. |
| 8,039,253 B2 | 10/2011 | Asou |
| 8,261,827 B2 | 9/2012 | Roddy |
| 8,297,357 B2 | 10/2012 | Brenneis |
| 2002/0033121 A1 | 3/2002 | Marko |
| 2002/0073897 A1 | 6/2002 | Trato |
| 2002/0117090 A1 | 8/2002 | Ku |
| 2003/0116065 A1 | 6/2003 | Griffith et al. |
| 2003/0116887 A1 | 6/2003 | Scott |
| 2003/0167970 A1 | 9/2003 | Polston |
| 2004/0007162 A1 | 1/2004 | Morioka et al. |
| 2004/0040475 A1 | 3/2004 | De La Roij et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0129181 A1 | 7/2004 | Lalande et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2004/0262000 A1 | 12/2004 | Morgan et al. |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0061505 A1 | 3/2005 | Caveny et al. |
| 2005/0072599 A1 | 4/2005 | Luke et al. |
| 2005/0077045 A1 | 4/2005 | Chatterj et al. |
| 2005/0084334 A1 | 4/2005 | Shi et al. |
| 2005/0098317 A1 | 5/2005 | Reddy et al. |
| 2005/0133221 A1 | 6/2005 | Chatterji et al. |
| 2006/0025312 A1 | 2/2006 | Santra et al. |
| 2006/0054319 A1 | 3/2006 | Fyten |
| 2006/0065399 A1 | 3/2006 | Luke et al. |
| 2006/0081372 A1 | 4/2006 | Dealy et al. |
| 2006/0166834 A1 | 7/2006 | Roddy |
| 2006/0175060 A1 | 8/2006 | Reddy |
| 2006/0213397 A1 | 9/2006 | Bethani |
| 2006/0260512 A1 | 11/2006 | Nordmeyer |
| 2007/0056475 A1 | 3/2007 | Roddy et al. |
| 2007/0056479 A1 | 3/2007 | Gray |
| 2007/0089643 A1 | 4/2007 | Roddy et al. |
| 2007/0102157 A1 | 5/2007 | Roddy et al. |
| 2007/0137528 A1 | 6/2007 | LeRoy-Delage et al. |
| 2007/0186820 A1 | 8/2007 | O'Hearn |
| 2007/0289744 A1 | 12/2007 | Bingamon et al. |
| 2008/0092780 A1 | 4/2008 | Bingamon et al. |
| 2008/0156491 A1 | 7/2008 | Roddy et al. |
| 2008/0229979 A1 | 9/2008 | Lewis |
| 2009/0044726 A1 | 2/2009 | Brouillette et al. |
| 2009/0105099 A1 | 4/2009 | Warrender et al. |
| 2009/0120644 A1 | 5/2009 | Roddy et al. |
| 2009/0124522 A1 | 5/2009 | Roddy et al. |
| 2009/0200029 A1 | 8/2009 | Roddy et al. |
| 2009/0266543 A1 | 10/2009 | Roddy et al. |
| 2009/0308611 A1 | 12/2009 | Santra et al. |
| 2009/0312445 A1 | 12/2009 | Roddy et al. |
| 2009/0320720 A1 | 12/2009 | Roddy et al. |
| 2010/0025039 A1 | 2/2010 | Roddy et al. |
| 2010/0041792 A1 | 2/2010 | Roddy et al. |
| 2010/0044043 A1 | 2/2010 | Roddy et al. |
| 2010/0044057 A1 | 2/2010 | Dealy et al. |
| 2010/0077922 A1 | 4/2010 | Constantz et al. |
| 2010/0081584 A1 | 4/2010 | Perez |
| 2010/0196104 A1 | 8/2010 | Constantz et al. |
| 2010/0258035 A1 | 10/2010 | Constantz et al. |
| 2010/0258312 A1 | 10/2010 | Brenneis et al. |
| 2010/0273912 A1 | 10/2010 | Roddy et al. |
| 2010/0282466 A1 | 11/2010 | Brenneis et al. |
| 2010/0292365 A1 | 11/2010 | Roddy et al. |
| 2010/0294496 A1 | 11/2010 | Woytowich et al. |
| 2010/0313793 A1 | 12/2010 | Constantz et al. |
| 2011/0000400 A1 | 1/2011 | Roddy |
| 2011/0017452 A1 | 1/2011 | Benkley |
| 2011/0100626 A1 | 5/2011 | Brenneis |
| 2012/0145393 A1 | 6/2012 | Roddy |
| 2012/0152539 A1 | 6/2012 | Karcher |
| 2012/0193097 A1 | 8/2012 | Roddy |
| 2012/0227631 A1 | 9/2012 | Roddy |
| 2012/0234541 A1 | 9/2012 | Roddy |
| 2012/0267107 A1 | 10/2012 | Benkley et al. |
| 2012/0318506 A1 | 12/2012 | Benkley et al. |
| 2012/0325119 A1 | 12/2012 | Brenneis et al. |
| 2012/0325476 A1 | 12/2012 | Brenneis et al. |
| 2012/0325477 A1 | 12/2012 | Brenneis et al. |
| 2012/0328377 A1 | 12/2012 | Brenneis et al. |

FOREIGN PATENT DOCUMENTS

| | | |
|---|---|---|
| CA | 2153372 | 1/2006 |
| CN | 1165849 | 11/1997 |
| CN | 1182062 | 5/1998 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| EP | 2075303 | 7/2009 |
| GB | 1469954 | 4/1997 |
| GB | 2455446 | 6/2009 |
| JP | 52117316 | 10/1977 |
| JP | 10110487 | 4/1998 |
| RU | 2026959 | 1/1995 |
| RU | 2003136028 A | 5/2005 |

| | | |
|---|---|---|
| SU | 1373781 | 2/1988 |
| WO | WO 83/01443 | 4/1983 |
| WO | WO 98/54108 | 12/1998 |
| WO | WO 00/63134 | 1/2000 |
| WO | WO 03/031364 | 4/2003 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2006/032841 | 3/2006 |
| WO | WO 2007/028952 | 3/2007 |
| WO | 2007/041841 | 4/2007 |
| WO | WO 2007/048999 | 5/2007 |
| WO | WO 2007/128945 | 11/2007 |
| WO | WO 2009/138747 | 11/2009 |

OTHER PUBLICATIONS

Smith, "Cementing" Society of Petroleum Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naigian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art, Petroleum Engineer International", Apr. 1978.
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-5 Cement Additive", 1998.
HES Brochure "HR-7 Cement Retarder", 1999.
HES Brochure "Pozmix A Cement Additive", 1999.
HES Brochure "SCR-100 Cement Retarder A Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LaFarge brochure "TerraCem™", Aug. 2006.
LaFarge MSDS "Cement Kiln Dust", Mar. 3, 2005.
LaFarge MSDS "LaFarge Blended Cement (cement)", Mar. 3, 2005.
TXI Material Safety Data Sheet for PRESSUR-SEAL, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-973, 2005.
Answer 3 of 24 Chemical Abstracts on STN "Effect of cement kiln dust substitution on chemical and physical properties and compressive strength of Portland and slag cements", Adb El-aleem et al. (abstract only), 2005.
Adaska and Taubert, "Beneficial Uses of Cement Kiln Dust", 2008 IEEE/PCA 50th Cement Industry Technical Conference, Miami, FL, May 19-22, 2008, pp. 1-19, 2008.
Nelson, "Well Cementing", 1990.
"Fly Ash Resource Center-Pozzolan," available at http://www.rmaiko.com/pozzolan.htm, Apr. 20, 2009.
HES Brochure "Enhancer 923™ Cement Agent", 2010.
HES Brochure "Enhancer 923™ Agent—Successes from the Field", 2010.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431, (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Office Action from U.S. Appl. No. 12/263,800, May 1, 2009.
Office Action from U.S. Appl. No. 12/283,398, Jul. 15, 2009.
Office Action from U.S. Appl. No. 12/263,800, Jul. 28, 2009.
Office Action from U.S. Appl. No. 12/420,630, Aug. 3, 2009.
Office Action from U.S. Appl. No. 12/349,676, Nov. 4, 2009.
Office Action from U.S. Appl. No. 12/606,381, Mar. 23, 2010.
Office Action from U.S. Appl. No. 12/609,993, Apr. 9, 2010.
Office Action from U.S. Appl. No. 12/609,993, Jun. 15, 2010.
Office Action from U.S. Appl. No. 12/558,097, Jun. 30, 2010.
Notice of Allowance from USPTO U.S. Appl. No. 12/609,993, Jul. 26, 2010.
Office Action from U.S. Appl. No. 12/558,097, Sep. 3, 2010.
Office Action from U.S. Appl. No. 12/844,612, Oct. 1, 2010.
Office Action from U.S. Appl. No. 12/544,915, Aug. 1, 2011.
Office Action from U.S. Appl. No. 12/844,612, Sep. 6, 2011.
Office Action from U.S. Appl. No. 12/264,010, Oct. 31, 2011.
Office Action from U.S. Appl. No. 12/844,612, Oct. 23, 2011.
Final Office Action from USPTO U.S. Appl. No. 12/264,010, Apr. 10, 2012.
Office Action from U.S. Appl. No. 12/844,612, Apr. 11, 2012.
Office Action from U.S. Appl. No. 13/399,913, May 15, 2012.
Office Action from U.S. Appl. No. 13/447,560, May 31, 2012.
Office Action from U.S. Appl. No. 12/821,412, Jun. 5, 2012.

Office Action from U.S. Appl. No. 12/825,004, Jun. 14, 2012.
Notice of Allowance from USPTO U.S. Appl. No. 13/447,560, Jun. 21, 2012.
Office action from U.S. Appl. No. 12/975,196, Jul. 3, 2012.
Final Office Action from USPTO U.S. Appl. No. 12/844,612, Jul. 30, 2012.
Notice of Allowance from USPTO U.S. Appl. No. 13/399,913, Aug. 23, 2012.
Notice of Allowance from USPTO U.S. Appl. No. 13/535,258, Sep. 7, 2012.
Notice of Allowance from USPTO U.S. Appl. No. 12/825,004, Sep. 20, 2012.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Foreign Search Report from PCT/GB2009/000295, Feb. 3, 2009.
Foreign Search Report from PCT/GB2009/000295, Jul. 30, 2009.
EPO Application No. 06794648.3 Examination Report, Apr. 17, 2009.
EPO Application No. 06779194.7 Examination Report, May 29, 2009.
PCT International Search Report and Written Opinion for International Application No. PCT/GB2009/000295, Jun. 30, 2009.
PCT International Search Report and Written Opinion for International Application No. PCT/G B2009/002597, Feb. 1, 2010.
PCT International Search Report and Written Opinion for International Application No. PCT/GB2009/002598, Feb. 11, 2010.
PCT International Search Report and Written Opinion for International Application No. PCT/GB2009/000295, Aug. 24, 2010.
PCT International Search Report and Written Opinion for International Application No. PCT/GB2010/001986, Jan. 19, 2011.
PCT International Search Report and Written Opinion for International Application No. PCT/GB2010/002011, Feb. 4, 2011.
PCT International Search Report and Written Opinion for International Application No. PCT/GB2009/002018, Mar. 24, 2011.
PCT International Search Report and Written Opinion for International Application No. PCT/GB2011/000933, Sep. 22, 2011.
PCT International Search Report and Written Opinion for International Application No. PCT/GB2011/001411, Jan. 27, 2012.
English language translation of USSR Patent No. RU 2026959, Jan. 20, 1995.
English language translation of Foreign Office Action for Application No. RU2008113765, Jul. 6, 2009.
English language translation of Chinese Application No. 200680042014.3, Dec. 1, 2010.
Foreign Office Action for Canadian Patent Application No. 2621835, Oct. 2, 2009.
Foreign Office Action for Canadian Patent Application No. 2621832, Oct. 5, 2009.
Foreign Office Action for Canadian Patent Application No. 2650630, Oct. 14, 2010.
Foreign Office Action for Canadian Patent Application No. 2658155, Nov. 16, 2010.
Foreign Office Action for Canadian Patent Application No. 2736148, May 29, 2012.
Foreign Office Action for CN Patent Application No. 200680042004.X, May 12, 2010.
Foreign Office Action for EP Application No. 06 779 199.6, Mar. 1, 2010.
Foreign Office Action for EP Application No. 06 779 191.3, Mar. 31, 2010.
Foreign Office Action for EP Application No. 06 779 194.7, Jul. 2, 2010.
Foreign Office Action for EP Application No. 06 794 646.7, Sep. 24, 2010.
Foreign Office Action for EP Application No. 09.713 469.6, Sep. 28, 2010.
Foreign Office Action for RU Application No. 2008113766, Jul. 14, 2009.
Foreign Office Action for RU Application No. 2008113766, Apr. 8, 2010.
Office Action from U.S. Appl. No. 13/477,777 dated Oct. 15, 2012.
Notice of Allowance from U.S. Appl. No. 12/844,612 dated Oct. 18, 2012.
Final Office Action from U.S. Appl. No. 12/975,196 dated Oct. 23, 2012.
Office Action from U.S. Appl. No. 13/555,624 dated Oct. 19, 2012.
U.S. Appl. No. 13/622,821, filed Oct. 26, 2012.
U.S. Appl. No. 13/669,149, filed Nov. 5, 2012.
Sugama, "Carbonation of Hydrothermally Treated Phosphate-Bonded Calcium Aluminate Cements", pp. 1-10, 1992.
USPTO Office Action from U.S. Appl. No. 13/479,476, Jul. 2, 2012.
Office Action from USPTO for U.S. Appl. No. 13/431,701 dated Nov. 9, 2012.
International Search Report and Written Opinion for PCT/US2012/046117 dated Oct. 26, 2012.
Office Action from USPTO for U.S. Appl. No. 13/669,149 dated Dec. 19, 2012.
Office Action from USPTO for U.S. Appl. No. 13/606,098 dated Dec. 13, 2012.
HES Brochure "VersaCem™ Cement" dated Jan. 2007.

SETTABLE COMPOSITIONS COMPRISING CEMENT KILN DUST AND RICE HUSK ASH AND METHODS OF USE

CROSS-REFERENCE TO RELATED APPLICATIONS

This application is a divisional of U.S. application Ser. No. 13/479,476, entitled "Settable Compositions Comprising Cement Kiln Dust and Rice Husk Ash and Methods of Use, filed May 24, 2012, issued as U.S. Pat. No. 8,327,939, which is a continuation-in-part of U.S. application Ser. No. 12/975,196, entitled "Settable Compositions Comprising Cement Kiln Dust, Unexpanded Perlite, and/or Pumicite," filed on Dec. 21, 2010, which is a continuation-in-part of U.S. patent application Ser. No. 12/821,412, entitled "Methods of Plugging and Abandoning a Well Using Compositions Comprising Cement Kiln Dust and Pumicite," filed on Jun. 23, 2010, issued as U.S. Pat. No. 8,307,899, which is a continuation-in-part of U.S. patent application Ser. No. 12/606,381, issued as U.S. Pat. No. 7,743,828, entitled "Methods of Cementing Subterranean Formation Formations Using Cement Kiln Dust in Compositions Having Reduced Portland Cement Content," filed on Oct. 27, 2009, which is a continuation-in-part of U.S. application Ser. No. 12/420,630, issued as U.S. Pat. No. 7,631,692, entitled "Settable Compositions Comprising a Natural Pozzolan and Associated Methods," filed on Apr. 8, 2009, which is a continuation-in-part of U.S. patent application Ser. No. 12/349,676, issued as U.S. Pat. No. 7,674,332, entitled "Extended Settable Compositions Comprising Cement Kiln Dust and Associated Methods," filed on Jan. 7, 2009, which is a divisional of U.S. patent application Ser. No. 12/034,886, issued as U.S. Pat. No. 7,478,675, entitled "Extended Settable Compositions Comprising Cement Kiln Dust and Associated Methods, filed on Feb. 21, 2008, which is a continuation-in-part of U.S. patent application Ser. No. 11/223,669, issued as U.S. Pat. No. 7,445,669, entitled "Settable Compositions Comprising Cement Kiln Dust and Additive(s)," filed Sep. 9, 2005, the entire disclosures of which are incorporated herein by reference.

BACKGROUND

The present invention relates to cementing operations and, more particularly, in certain embodiments, to methods and compositions that comprise cement kiln dust ("CKD") and rice husk ash.

In cementing methods, such as well construction and remedial cementing, settable compositions are commonly utilized. As used herein, the term "settable composition" refers to a composition(s) that hydraulically sets or otherwise develops compressive strength. Settable compositions may be used in primary cementing operations whereby pipe strings, such as casing and liners, are cemented in well bores. In performing primary cementing, a settable composition may be pumped into an annulus between a subterranean formation and the pipe string disposed in the subterranean formation. The settable composition should set in the annulus, thereby forming an annular sheath of hardened cement (e.g., a cement sheath) that should support and position the pipe string in the well bore and bond the exterior surface of the pipe string to the walls of the well bore. Settable compositions also may be used in remedial cementing methods, such as the placement of cement plugs, and in squeeze cementing for sealing voids in a pipe string, cement sheath, gravel pack, formation, and the like.

Settable compositions used heretofore commonly comprise Portland cement. Portland cement generally is a major component of the cost for the settable compositions. To reduce the cost of such settable compositions, other components may be included in the settable composition in addition to, or in place of, the Portland cement. Such components may include fly ash, slag cement, shale, metakaolin, micro-fine cement, and the like. "Fly ash," as that term is used herein, refers to the residue from the combustion of powdered or ground coal, wherein the fly ash carried by the flue gases may be recovered, for example, by electrostatic precipitation. "Slag," as that term is used herein, refers to a granulated, blast furnace by-product formed in the production of cast iron and generally comprises the oxidized impurities found in iron ore. Slag cement generally comprises slag and a base, for example, such as sodium hydroxide, sodium bicarbonate, sodium carbonate, or lime, to produce a settable composition that, when combined with water, may set to form a hardened mass.

SUMMARY

The present invention relates to cementing operations and, more particularly, in certain embodiments, to methods and compositions that comprise CKD and rice husk ash.

An embodiment provides a method of cementing comprising: placing a settable composition into a subterranean formation, the settable composition comprising cement kiln dust, rice husk ash, and water; and allowing the settable composition to set.

Another embodiment provides a method of cementing comprising: placing a settable composition into a subterranean formation, the settable composition comprising cement kiln dust, rice husk ash, Portland cement, and water; and allowing the settable composition to set.

Another embodiment provides a method of cementing comprising: placing a settable composition into a subterranean formation, the settable composition comprising: cement kiln dust, rice husk ash, and water, wherein the cement kiln dust is present in an amount in a range of from about 50% to about 80% by weight of the cement kiln dust and the rice husk ash, wherein the rice husk ash is present in an amount in a range of from about 20% to about 50% by weight of the cement kiln dust and the rice husk ash, wherein the water is present in an amount in a range of from about 40% to about 200% by weight of the cement kiln dust and the rice husk ash, wherein the settable composition is essentially free of Portland cement; and allowing the settable composition to set.

Another embodiment provides a settable composition comprising: cement kiln dust; rice husk ash; and water.

The features and advantages of the present invention will be readily apparent to those skilled in the art. While numerous changes may be made by those skilled in the art, such changes are within the spirit of the invention.

DETAILED DESCRIPTION

The present invention relates to cementing operations and, more particularly, in certain embodiments, to methods and compositions that comprise CKD and rice husk ash. There may be several potential advantages to the methods and compositions of the present invention, only some of which may be alluded to herein. One of the many potential advantages of embodiments of the present invention is that inclusion of rice husk ash in settable compositions comprising CKD may improve the mechanical properties of the CKD-containing settable compositions. By way of example, inclusion of rice husk ash may provide increased compressive strength for settable compositions comprising CKD. Another potential advantage of embodiments of the present invention is that the CKD and/or rice husk ash may be used to reduce the cost of the settable compositions. For example, use of waste CKD and/or rice husk ash to replace a higher cost component, such as Portland cement, should result in a more economical settable composition.

Embodiments of the settable compositions of the present invention may comprise CKD, rice husk ash, and water. Other optional additives may also be included in embodiments of the settable compositions as desired, including, but not limited to, unexpanded perlite, pumicite, fly ash, slag cement, metakaolin, shale, zeolite, combinations thereof, and the like. Embodiments of the settable compositions may also be foamed and/or extended as desired by those of ordinary skill in the art. The settable compositions of the present invention should have a density suitable for a particular application as desired by those of ordinary skill in the art, with the benefit of this disclosure. In some embodiments, the settable compositions may have a density in the range of from about 8 pounds per gallon ("ppg") to about 16 ppg. In other embodiments, the settable compositions may be foamed to a density in the range of from about 8 ppg to about 13 ppg.

Embodiments of the settable compositions generally may comprise CKD. As used herein, the term "CKD" refers to a partially calcined kiln feed which is removed from the gas stream and collected, for example, in a dust collector during the manufacture of cement. Usually, large quantities of CKD are collected in the production of cement that are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

The CKD generally may exhibit cementitious properties, in that it may set and harden in the presence of water. In accordance with embodiments of the present invention, the CKD may be used, among other things, to replace higher cost cementitious components, such as Portland cement, resulting in more economical settable compositions. In addition, substitution of the CKD for the Portland cement can result in a settable composition with a reduced carbon footprint.

The CKD may be included in the settable compositions in an amount sufficient to provide the desired compressive strength, density, cost reduction, and/or reduced carbon footprint. In some embodiments, the CKD may be present in the settable compositions of the present invention in an amount in the range of from about 0.1% to about 99% by weight of cementitious components. Cementitious components include those components or combinations of components of the settable compositions that hydraulically set, or otherwise harden, to develop compressive strength, including, for example, CKD, rice husk ash, unexpanded perlite, fly ash, pumicite, slag, lime, shale, and the like. The CKD may be present, in certain embodiments, in an amount ranging between any of and/or including any of about 0.1%, about 1%, about 5%, about 10%, about 15%, about 20%, about 25%, about 30%, about 35%, about 40%, about 45%, about 50%, about 55%, about 60%, about 65%, about 70%, about 75%, about 80%, about 90%, about 95%, or about 99%. In one embodiment, the CKD may be present in the settable compositions in an amount in the range of from about 5% to about 95% by weight of cementitious components. In another embodiment, the CKD may be present in an amount in the range of from about 50% to about 95% by weight of cementitious components. In yet another embodiment, the CKD may be present in an amount in the range of from about 50% to about 80% by weight of cementitious components. One of ordinary skill in the art, with the benefit of this disclosure, will recognize the appropriate amount of CKD to include for a chosen application.

Embodiments of the settable compositions generally may comprise rice husk ash. As used herein, the term "rice husk" refers to the hard protective coverings of grains of rice that are separated from the rice during production. Rice husks are also commonly referred to as rice hulls or rice shells. Large quantities of rice husks are typically generated during the production of rice that are usually disposed of as waste. However, disposal of the rice husks in landfills can be problematic as space in landfills may be limited. The rice husks typically contains a substantially amount of silica and when burned yield an ash, referred to herein as "rice husk ash," which is rich in amorphous silica. In some embodiment, the ash obtained from combustion of the rice husks may be further processed by dry grinding the ash to a powder form.

Addition of the rice husk ash to settable compositions comprising CKD has been shown to provide increases in compressive strength. In accordance with present embodiments, the rice husk ash may be included in CKD-containing settable compositions to increase the compressive strength thereof. By way of example, inclusion of the rice husk ash in a settable compositions comprising CKD may increase the compressive strength in an amount greater than or equal to about 10% in one embodiment, greater than or equal to about 25% in another embodiment, greater than or equal to about 50% in another embodiment, and greater than or equal to about 75% in yet another embodiment, as compared to the same settable composition that does not contain the latex strength enhancer. As used herein, "compressive strength" is measured at a specified time after the composition has been mixed and the composition is maintained under specified temperature and pressure conditions. For example, compressive strength can be measured at a time in the range of about 24 to about 48 hours after the composition is mixed and the composition is maintained at a temperature of 160° F. and atmospheric pressure. Compressive strength can be measured by either a destructive method or non-destructive method. The destructive method physically tests the strength of settable composition samples at various points in time by crushing the samples in a compression-testing machine. The compressive strength is calculated from the failure load divided by the cross-sectional area resisting the load and is reported in units of pound-force per square inch (psi). Non-destructive methods typically may employ an Ultrasonic Cement Analyzer ("UCA"), available from Fann Instrument Company, Houston, Tex.

In some embodiments, the rice husk ash may be present in the settable compositions of the present invention in an amount in the range of from about 0.1% to about 99% by weight of cementitious components. The rice husk ash may be present, in certain embodiments, in an amount ranging between any of and/or including any of about 0.1%, about 1%, about 5%, about 10%, about 15%, about 20%, about 25%, about 30%, about 35%, about 40%, about 45%, about 50%, about 55%, about 60%, about 65%, about 70%, about 75%, about 80%, about 90%, about 95%, or about 99%. In one embodiment, the rice husk ash may be present in the settable compositions in an amount in the range of from about 5% to about 95% by weight of cementitious components. In another embodiment, the rice husk ash may be present in an amount in the range of from about 5% to about 50% by weight of cementitious components. In yet another embodiment, the rice husk ash may be present in an amount in the range of from about 20% to about 50% by weight of cementitious components. One of ordinary skill in the art, with the benefit of this disclosure, will recognize the appropriate amount of rice husk ash to include for a chosen application.

The water that may be used in embodiments of the settable compositions includes, for example, freshwater, saltwater (e.g., water containing one or more salts dissolved therein), brine (e.g., saturated saltwater produced from subterranean formations), seawater, or combinations thereof. Generally, the water may be from any source, provided that the water does not contain an excess of compounds that may undesirably affect other components in the settable composition. In some embodiments, the water may be included in an amount sufficient to form a pumpable slurry. In some embodiments, the water may be included in the settable compositions of the present invention in an amount in the range of about 40% to about 200% by weight of cementitious components. In some embodiments, the water may be included in an amount in the range of about 40% to about 150% by weight of cementitious components. One of ordinary skill in the art, with the benefit of this disclosure, will recognize the appropriate amount of water to include for a chosen application.

In some embodiments, the settable compositions may further comprise a hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, silica cements, and any combination thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990. In addition, in some embodiments, cements suitable for use in the present invention may include cements classified as ASTM Type I, II, or III.

It should be understood that use of hydraulic cement in embodiments of the settable compositions in addition to the CKD and/or rice husk ash can be reduced or even eliminated to provide, for example, the desired cost savings and/or reduced carbon footprint. Accordingly, embodiments of the settable compositions of the present invention may comprise hydraulic cement in an amount of 0% to about 75%. For example, the hydraulic cement may be present, in certain embodiments, in an amount ranging between any of and/or including any of about 1%, about 5%, about 10%, about 15%, about 20%, about 24%, about 25%, about 30%, about 35%, about 40%, about 50%, about 55%, about 60%, about 65%, about 70%, or about 75%. In an embodiment, the hydraulic cement may be present in an amount in the range of from about 0% to about 20%. In another embodiment, the hydraulic cement may be present in an amount in the range of from about 0% to about 10%. In yet another embodiment, the settable compositions may be essentially free of hydraulic cement. As used herein, the term "essentially free" means that hydraulic cement is not present or, to the extent, that trace amounts of hydraulic cement may be present, is present in an amount less than about 1% by weight of cementitious components. In certain embodiments, the settable composition may contain hydraulic cement in an amount less than about 0.1% by weight of cementitious components and, alternatively, less than about 0.01% by weight of cementitious components. By way of example, the settable composition, in certain embodiments, may be free of hydraulic cement, in that the settable composition contains no hydraulic cement.

Embodiments of the settable compositions further may comprise a set retarding additive. As used herein, the term "set retarding additive" refers to an additive that retards the setting of the settable compositions of the present invention. Examples of suitable set retarding additives include, but are not limited to, ammonium, alkali metals, alkaline earth metals, metal salts of sulfoalkylated lignins, organic acids (e.g., hydroxycarboxy acids), copolymers that comprise acrylic acid or maleic acid, and combinations thereof. One example of a suitable sulfoalkylated lignin comprises a sulfomethylated lignin. Suitable set retarding additives are disclosed in more detail in U.S. Pat. No. Re. 31,190, the entire disclosure of which is incorporated herein by reference. Suitable set retarding additives are commercially available from Halliburton Energy Services, Inc. under the trademarks HR® 4, HR® 5, HR® 7, HR® 12, HR®15, HR®25, HR 601, SCR™ 100, and SCR™ 500 retarders. Generally, where used, the set retarding additive may be included in the settable compositions of the present invention in an amount sufficient to provide the desired set retardation. In some embodiments, the set retarding additive may be present in the settable compositions of the present invention an amount in the range of about 0.1% to about 5% by weight of cementitious components. One of ordinary skill in the art, with the benefit of this disclosure, will recognize the appropriate amount of the set retarding additive to include for a chosen application.

Optionally, other additional additives may be added to the settable compositions of the present invention as deemed appropriate by one skilled in the art, with the benefit of this disclosure. Examples of such additives include, but are not limited to, strength-retrogression additives, set accelerators, weighting agents, lightweight additives, gas-generating additives, mechanical property enhancing additives, lost-circulation materials, filtration-control additives, dispersants, fluid-loss-control additives, defoaming agents, foaming agents, oil-swellable particles, water-swellable particles, thixotropic additives, and combinations thereof. Specific examples of these, and other, additives include unexpanded perlite, pumicite, fly ash, slag cement, metakaolin, shale, zeolite, crystalline silica, amorphous silica, fumed silica, salts, fibers, hydratable clays, microspheres, elastomers, elastomeric particles, resins, latex, combinations thereof, and the like. A person having ordinary skill in the art, with the benefit of this disclosure, will readily be able to determine the type and amount of additive useful for a particular application and desired result.

In some embodiments, the CKD and the rice husk ash may be combined to form a cementitious component. In addition to the CKD and rice husk ash, additional components may also be included in the cementitious component as filler or for other purposes as will be apparent to one of ordinary skill in the art with the benefit of this disclosure. For example, other components that may set and harden in the presence of water can also be included in the cementitious component. In some embodiments, the cementitious component further may comprise unexpanded perlite, pumicite, fly ash, slag cement, metakaolin, shale, zeolite, or combinations thereof. In some embodiments, the cementitious component may be placed in a bag or other suitable container for storage and/or delivery to a well site. In an embodiment, the cementitious component may then be combined with water to create a settable composition.

In some embodiments, the components of the settable compositions may be combined in any order as will be appreciated by those of ordinary skill in the art. In one embodiment, the CKD and rice husk ash may be combined with water to create a settable composition. As will be appreciated, one or more additional components as described above, for example, may also be included in the settable composition. The components of the settable composition may be combined using any mixing device compatible with the composition as known to one of ordinary skill in the art, for example a bulk mixer.

As will be appreciated by those of ordinary skill in the art, embodiments of the settable compositions may be used in a variety of subterranean applications, including primary and remedial cementing. Embodiments of the settable compositions may be introduced into a subterranean formation and allowed to set therein. For example, the settable composition may be placed into a space between a subterranean formation and a conduit located in the subterranean formation. As used herein, introducing the settable composition into a subterranean formation includes introduction into any portion of the subterranean formation, including, without limitation, into a well bore drilled into the subterranean formation, into a near well bore region surrounding the well bore, or into both.

In primary cementing embodiments, for example, a settable composition may be introduced into a space outside a conduit (e.g., pipe strings, liners) located in the subterranean formation. The conduit may be located in a well bore drilled into the subterranean formation. The settable composition may be allowed to set to form an annular sheath of hardened cement in the space outside conduit. Among other things, the set settable composition may Irwin a barrier, preventing the migration of fluids in the well bore. The set settable composition also may, for example, support the conduit in the well bore.

In remedial cementing embodiments, a settable composition may be used, for example, in squeeze-cementing operations or in the placement of cement plugs. By way of example, the settable composition may be placed in a well bore to plug a void or crack in the formation, in a gravel pack, in the conduit, in the cement sheath, and/or a microannulus between the cement sheath and the conduit.

To facilitate a better understanding of the present invention, the following example of certain aspects of some embodiments is given. In no way should the following example be read to limit, or define, the scope of the invention.

EXAMPLE

A series of sample settable compositions were prepared and tested to analyze the force resistance properties of settable compositions that comprise CKD and rice husk ash. The sample compositions were allowed to cure in a water bath at 160° F. for 24 hours at ambient pressure. Immediately after removal from the water bath, crush strengths (destructive compressive strengths) were determined using a Tinius Olsen tester. The results of the crush strength tests are set forth in the table below.

Ten different tests were conducted, designated Test Nos. 1-10, using the indicated amounts of water, CKD, rice husk ash, hydrated lime, and cement dispersant. The amounts of these components are indicated in the table below with percent by weight ("% by wt") indicating the percent of the component by weight of the cement and rice husk ash. The amount of rice husk ash was varied in an amount ranging from 0% to 50% by weight. Tests 1 and 5 were comparative tests that did not include any rice husk ash. The dispersant used was CFR-3™ cement friction reducer, from Halliburton Energy Services, Inc., Duncan, Okla. The CKD used was supplied by Holcem (US) Inc., from Ada, Okla. The rice husk ash used was supplied by Riceland Foods, Inc., Stuttgart, Ark., and had particles ranging from about 1 micron to about 10 microns.

TABLE 1

Crush Strength Tests

| Test No. | Water (% by wt) | CKD (% by wt) | Rice Husk Ash (% by wt) | Hydrate Lime (% by wt) | Dispersant (% by wt) | 24-Hr Crush Strength (psi) |
|---|---|---|---|---|---|---|
| 1 | 48.75 | 100 | — | — | 0.75 | 1437 |
| 2 | 48.9 | 95 | 5 | — | 0.75 | 1542 |
| 3 | 50.64 | 95 | 5 | 5 | 0.75 | 1400 |
| 4 | 49.06 | 90 | 10 | — | 0.75 | 1556 |
| 5 | 89.72 | 100 | — | — | — | 275 |
| 6 | 90.5 | 80 | 20 | — | — | 417 |
| 7 | 90.69 | 75 | 25 | — | — | 483 |
| 8 | 90.89 | 70 | 30 | — | — | 532 |
| 9 | 91.28 | 60 | 40 | — | — | 446 |
| 10 | 91.67 | 50 | 50 | — | 0.75 | 479 |

This example thus indicates that inclusion of the rice husk ash provides strength enhancement to CKD-containing compositions. Indeed, increases in compressive strength of 50% or more were obtained for Tests No. 6-10 having a density of 12.5 ppg and containing rice husk ash in an amount ranging from 20% to 50% by weight, as compared to Test No. 5 that did not contain any rice husk ash.

It should be understood that the compositions and methods are described in terms of "comprising," "containing," or "including" various components or steps, the compositions and methods can also "consist essentially of" or "consist of" the various components and steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recite. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention.

What is claimed is:

1. A settable composition comprising:
cement kiln dust;
rice husk ash; and
water.

2. The composition of claim 1 wherein the settable composition has a density in a range of from about 8 pounds per gallon to about 16 pounds per gallon, and wherein the water is present in an amount in a range of from about 40% to about 200% by weight of cementitious components.

3. The composition of claim 1 wherein the cement kiln dust is present in an amount in a range of from about 50% to about 95% by weight of cementitious components.

4. The composition of claim 1 wherein the cement kiln dust is present in an amount in a range of from about 70% to about 95% by weight of cementitious components.

5. The composition of claim 1 wherein the cement kiln dust is present in an amount in a range of from about 90% to about 95% by weight of cementitious components.

6. The composition of claim 1 wherein the rice husk ash is present in an amount in a range of from about 5% to about 50% by weight of cementitious components.

7. The composition of claim 1 wherein the rice husk ash is included in the settable composition in an amount sufficient to increase the 24-hour destructive compressive strength of the settable composition at 160° F. and atmospheric pressure in an amount equal to or greater than about 10%.

8. The composition of claim 1 wherein the rice husk ash is included in the settable composition in an amount sufficient to increase the 24-hour destructive compressive strength of the settable composition at 160° F. and atmospheric pressure in an amount equal to or greater than about 75%.

9. The composition of claim 1 wherein the settable composition is essentially free of hydraulic cement in addition to the cement kiln dust.

10. The composition of claim 1 wherein the settable composition further comprises at least one additive selected from the group consisting of unexpanded perlite, pumicite, lime, fly ash, slag cement, metakaolin, shale, zeolite, crystalline silica, amorphous silica, fumed silica, salt, fiber, hydratable clay, microsphere, elastomer, elastomeric particle, resin, latex, and any combination thereof.

11. The composition of claim 1 wherein the settable composition further comprises at least one additive selected from the group consisting of a set-retarding additive, strength-retrogression additive, a set accelerator, a weighting agent, a lightweight additive, a gas-generating additive, a mechanical property enhancing additive, a lost-circulation material, a filtration-control additive, a dispersant, a fluid-loss-control additive, a defoaming agent, a foaming agent, an oil-swellable particle, a water-swellable particle, a thixotropic additive, and any combination thereof.

12. A settable composition comprising:
a partially calcined kiln feed removed from a gas stream, wherein the partially calcined kiln feed comprises $SiO_2$, $Al_2O_3$, $Fe_2O_3$, CaO, MgO, $SO_3$, $Na_2O$, and $K_2O$;
rice husk ash; and
water.

13. The composition of claim 12 wherein the partially calcined kiln feed is present in an amount in a range of from about 50% to about 95% by weight of cementitious components, and wherein the rice husk ash is present in an amount in a range of from about 5% to about 50% by weight of cementitious components.

14. The composition of claim 12 wherein the partially calcined kiln feed is present in an amount in a range of from about 70% to about 95% by weight of cementitious components.

15. The composition of claim 12 wherein the partially calcined kiln feed is present in an amount in a range of from about 90% to about 95% by weight of cementitious components.

16. The composition of claim 12 wherein the partially calcined kiln feed is from the manufacture of cement.

17. The composition of claim 12 wherein the rice husk ash is included in the settable composition in an amount sufficient to increase the 24-hour destructive compressive strength of the settable composition at 160° F. and atmospheric pressure in an amount equal to or greater than about 10%.

18. The composition of claim 12 wherein the rice husk ash is included in the settable composition in an amount sufficient to increase the 24-hour destructive compressive strength of the settable composition at 160° F. and atmospheric pressure in an amount equal to or greater than about 75%.

19. The composition of claim 12 wherein the settable composition is essentially free of hydraulic cement in addition to the cement kiln dust.

20. The composition of claim 12 wherein the settable composition further comprises at least one additive selected from the group consisting of unexpanded perlite, pumicite, lime, fly ash, slag cement, metakaolin, shale, zeolite, crystalline silica, amorphous silica, fumed silica, salt, fiber, hydratable clay, microsphere, elastomer, elastomeric particle, resin, latex, and any combination thereof.

21. The composition of claim 12 wherein the settable composition further comprises at least one additive selected from the group consisting of a set-retarding additive, strength-retrogression additive, a set accelerator, a weighting agent, a lightweight additive, a gas-generating additive, a mechanical property enhancing additive, a lost-circulation material, a filtration-control additive, a dispersant, a fluid-loss-control additive, a defoaming agent, a foaming agent, an oil-swellable particle, a water-swellable particle, a thixotropic additive, and any combination thereof.

22. A settable composition comprising:
cement kiln dust in an amount in a range of from about 50% to about 95% by weight of cementitious components;
rice husk ash in an amount sufficient to increase the 24-hour destructive compressive strength of the settable composition at 160° F. and atmospheric pressure in an amount equal to or greater than about 10%; and
water in an amount in a range of from about 40% to about 200% by weight of cementitious components,
wherein the settable composition has a density in a range of from about 8 pounds per gallon to about 16 pounds per gallon.

23. The composition of claim 22 wherein the cement kiln dust is present in an amount in a range of from about 70% to about 95% by weight of cementitious components.

24. The composition of claim 22 wherein the settable composition further comprises at least one additive selected from the group consisting of unexpanded perlite, pumicite, lime, fly ash, slag cement, metakaolin, shale, zeolite, crystalline silica, amorphous silica, fumed silica, salt, fiber, hydratable clay, microsphere, elastomer, elastomeric particle, resin, latex, and any combination thereof.

25. The composition of claim 22 wherein the settable composition further comprises at least one additive selected from the group consisting of a set-retarding additive, strength-retrogression additive, a set accelerator, a weighting agent, a lightweight additive, a gas-generating additive, a mechanical property enhancing additive, a lost-circulation material, a filtration-control additive, a dispersant, a fluid-loss-control additive, a defoaming agent, a foaming agent, an oil-swellable particle, a water-swellable particle, a thixotropic additive, and any combination thereof.

* * * * *